June 5, 1956
C. A. ANDERSON
2,749,504
INSTRUMENT FOR DETERMINING MAGNETIC PERMEABILITY
Filed Dec. 27, 1951
2 Sheets-Sheet 1
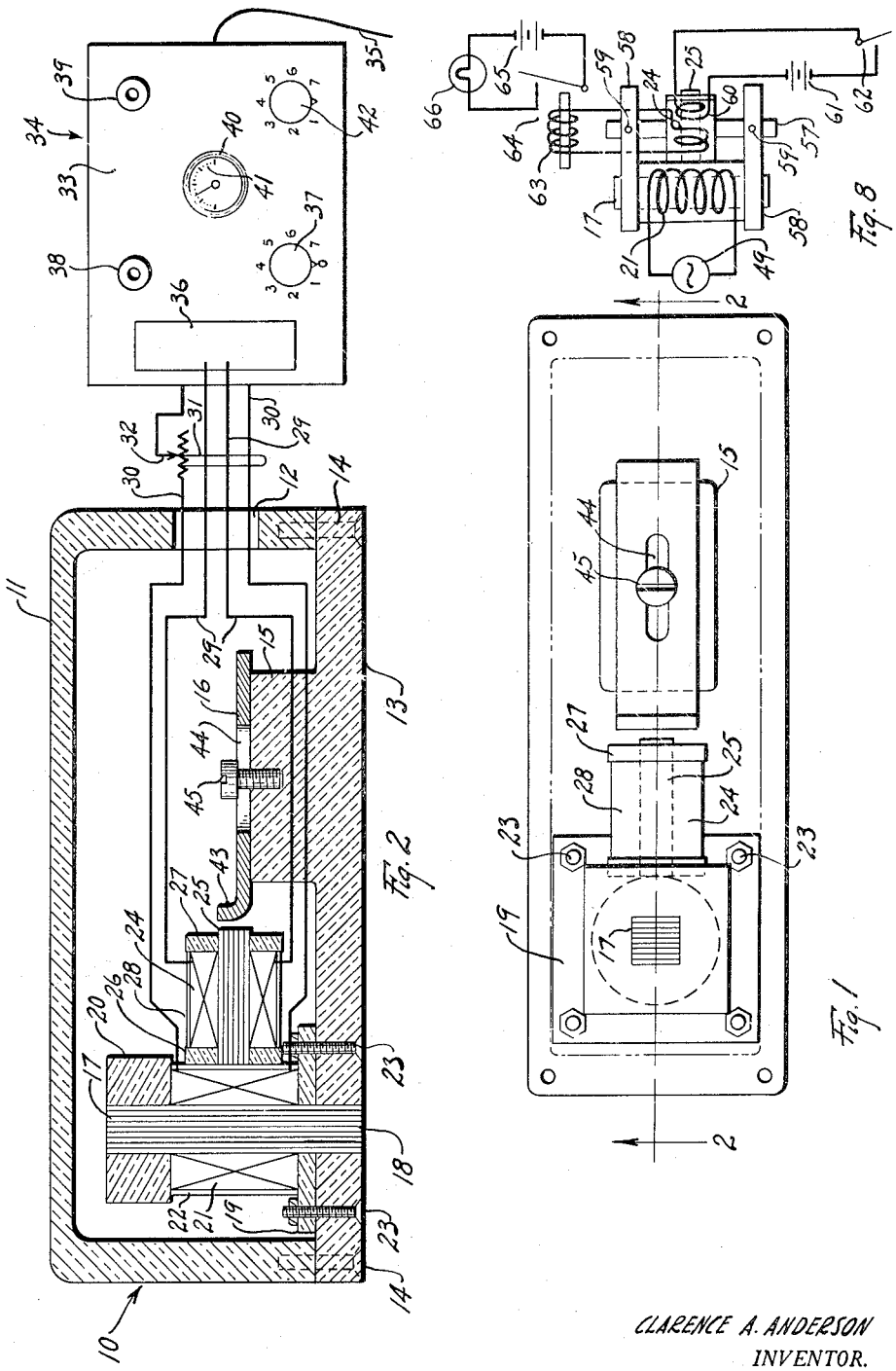
CLARENCE A. ANDERSON
INVENTOR.
BY S. Tierney Jr.
ATTORNEY

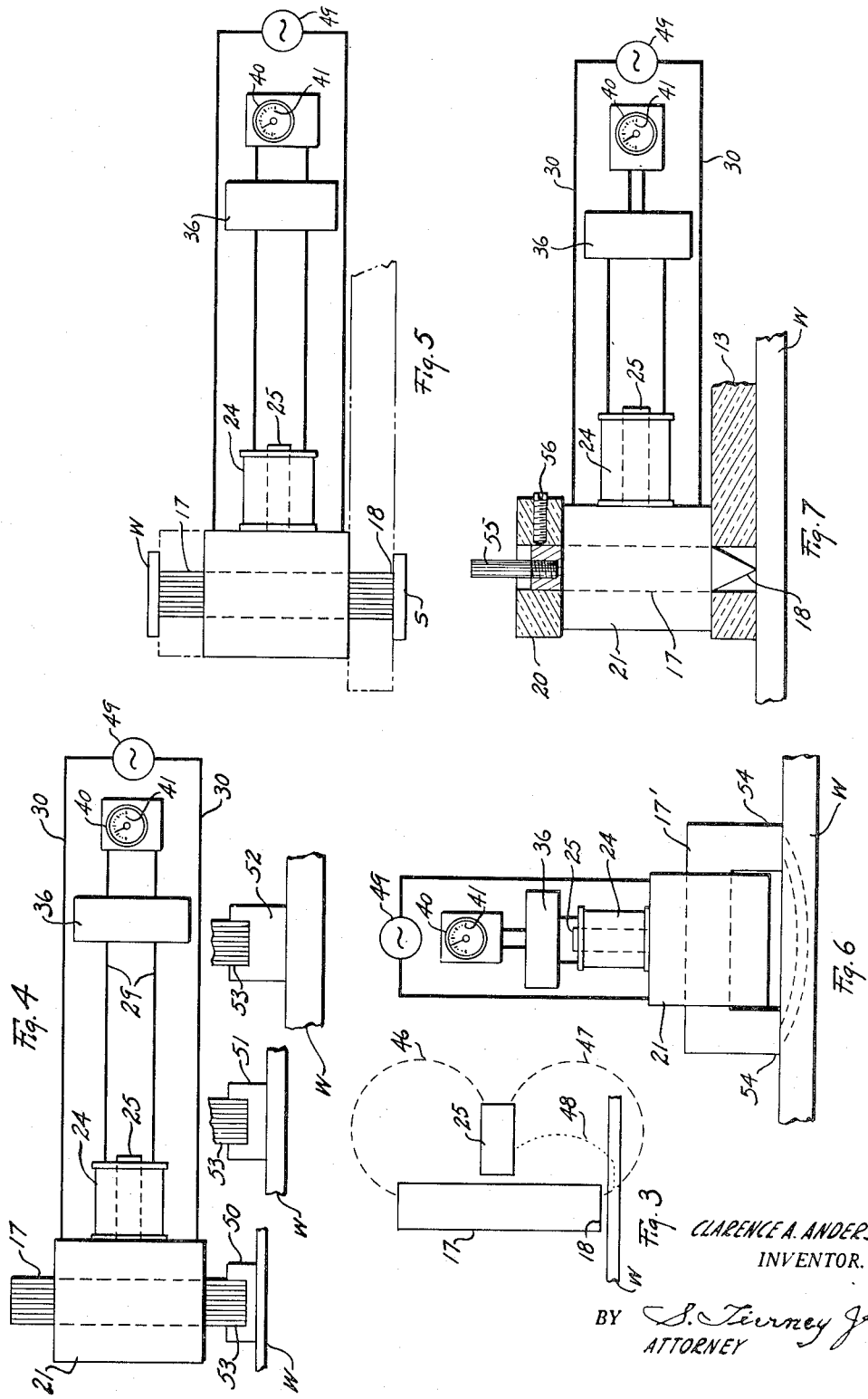

United States Patent Office 2,749,504
Patented June 5, 1956

2,749,504
INSTRUMENT FOR DETERMINING MAGNETIC PERMEABILITY

Clarence A. Anderson, San Diego, Calif.

Application December 27, 1951, Serial No. 263,617

6 Claims. (Cl. 324—34)

This invention relates to an instrument for measuring the magnetic permeability of materials and while it is especially useful for such measurement of paramagnetic materials such as iron or stainless steel it is also sensitive enough to measure the permeability of diamagnetic materials.

An object of the invention is to provide an instrument of the type described which is light in weight and readily portable and does not require any special voltage source for its operation but may be used particularly wherever a standard 60 cycle wall outlet is available.

Another object of the invention is to provide an A. C. operated magnet system which is normally balanced but which becomes unbalanced when it is brought into proximity to a workpiece or other member to be tested.

A further object is to provide a testing instrument of the type described in which all the component parts are stationary and therefore of long life. Furthermore by the absence of moving parts, all noise is avoided such as usually accompanies the operation of moving parts.

Another object is to provide a magnetic testing instrument designed to concentrate a large amount of magnetic flux into a very small exploring area so that small regions of a member may be individually explored to determine whether they contain any hard spots, cracks, blow holes or other defects.

Further objects will become apparent as the description of the instrument proceeds. For a better understanding of the invention, reference is made to the accompanying drawings, in which;

Figure 1 is a top view of an instrument embodying the invention with the cover removed;

Figure 2 is a view partly in section on the line 2—2 of Figure 1 and partly schematic of the device of Figure 1 and an associated control panel;

Figure 3 is a view of portions of the device of Figure 1 and its magnetic circuit;

Figures 4, 5 and 8 are views showing different uses of the instrument;

Figures 6 and 7 are views showing further modifications of the instrument.

Referring to Figures 1 to 3, the instrument comprises a casing 10 made of Bakelite or other nonmagnetic material, the casing having a cover 11 which has an opening 12 at one end. The cover is attached to the base portion 13 by a plurality of screws 14, the base 13 having an integrally formed pedestal 15 adapted to support an iron or steel slide 16. A laminated soft iron core 17 passes through base 13 with its lower end 18 flush with the lower face of the base. Instead of a laminated core a solid core of Permalloy or other magnetic alloy of small retentivity and hysteresis may be used. Core 17 passes snugly through lower and upper coil supports 19, 20 between which is wound an energizing coil 21 of many turns of copper wire adapted to carry current from a commercial 110 volt A. C. supply. Coil 21 is wrapped and covered by a layer of insulating tape forming a winding cover 22. The coil assembly is held in position by four screws 23 which pass through registering holes in base 13 and support 19. A voltage coil 24 is inductively coupled with coil 21 in a manner to be described, coil 24 comprising a large number of turns of fine copper wire wound on a laminated iron core 25 between the spool heads 26, 27. Coil winding 24 is preferably covered with a cover 28 of a winding of insulating tape, the output leads 29 of the coil passing through opening 12 in the casing as do also the input leads 30 which supply alternating current to coil 21. The pairs of leads 29 and 30 are insulated covered wires which preferably comprise a flexible cable as indicated at 31. The upper lead 30 is connected to a variable resistor 32 which controls the current supplied to energizing coil 21, the leads 30 being connected to terminals on a control panel 33 forming the front of a closed casing 34, a pair of conductors in a flexible supply cable 35 furnishing alternating current from any standard 60 cycle outlet. Leads 29 terminate in a vacuum tube amplifier 36 of two or more stages, one of which contains a variable resistor (not shown) whose adjustable contact is operated by a volume control knob 37. The output terminals of amplifier 36 are connected to a telephone jack 38, an oscilloscope jack 39 and an electrical meter 40 having a graduated scale 41, the meter terminals having connected across them a variable shunt (not shown) controlled by a knob 42. To effect a magnetic balance in a manner to be described, slide 16 has an upturned end 43 and a slot 44 through which a screw 45 passes to hold the slide in any desired position on pedestal 15. All the screws used within casing 10 are made of brass, bronze or other nonmagnetic material.

Before the assembly is put in casing 10, a headphone is connected to jack 38 and 60 cycle current supplied to energizing coil 21. The coil assembly including coil 24 and core 25 is then moved along coil cover 22 with core 25 disposed perpendicular to core 17 until the magnetic circuit is balanced, which is evidenced by the absence of sound in the phones. Spool head 26 in this position is cemented fast to cover 22 and after the cement has hardened, the assembly is secured in casing 10 in the position shown in Figures 1 and 2. Energizing current is again supplied to coil 21 and if meter 40 does not read zero, screw 45 is loosened and slide 16 moved in a direction to restore the magnetic balance and give a zero meter reading, screw 45 being then tightened. After replacing cover 11, the instrument is ready for use to determine the permeability of a workpiece. This is done by merely moving the instrument along with the end 18 of core 17 in contact with the workpiece. It is found when testing sheets of stainless steel that a hard spot has a different permeability than the normal steel and that when the core end 18 reaches such a spot, a change in the meter reading takes place.

Among the factors which unbalance the magnetic circuit when the instrument is placed on a workpiece of paramagnetic material appear to be (1) the change in the reluctance of the magnetic circuit due merely to the presence of the material and (2) the change in the reluctance due to a change in the path of the magnetic lines of flux. It is evident that the placement of even a small steel disc against the face 18 of core 17, will decrease the reluctance of this portion of the flux path so that the pattern of the lines of flux issuing from the top of core 17 and which traverse core 25 or coil 24 is no longer similar to the pattern of the lines issuing from the bottom end 18 of the core. Referring to Figure 3, two lines of flux 46, 47 are shown passing from core 17 to core 25 when the circuit is balanced in the absence of iron workpiece W. The flux pattern is symmetrical so that the resultant flux passing through core 25 is zero. When workpiece W is put in place, flux line 47 will no longer take the long path through the air but follow a shorter path 48 as indicated in dotted line, a portion of this path lying within the workpiece. Similar displacements take place with many of the other flux lines emanating from end 18 of the core with the result that a considerable unbalance in the magnetic circuit results with the attendant generation of a voltage in coil 24. From the above it will be clear that the reluctance of the magnetic circuit is changed by the presence of the workpiece.

In using the instrument the variable resistor 32 is set at a value to produce a current in coil 21 to generate enough magnetic flux to give the desired depth of penetration in the workpiece. Volume control knob 37 is then set to give the desired amount of voltage amplification. Knob 42 is then turned to set the meter shunt at a value which gives a meter reading of 1.0, the permeability of air. As the casing 15 is moved along over the surface of a large sheet of steel or other workpiece, the meter reading will vary whenever a region of different permeability is reached.

The instrument may be used for locating flaws, fissures, blow holes or other imperfections in metals, for finding pipes, electrical outlets or other members concealed in building structures or metal plates in streets or sidewalks which have been covered over by dirt. It may also be used for testing rocks or soil to determine the presence of magnetic material.

Referring to Figure 4, A. C. current is supplied to energizing coil 21 by voltage source 49 and a set of air gap gauges 50, 51, 52 are provided to establish air gaps of different length between the end of core 17 and the workpiece. For this use, the core 17 of Figure 1 is made to extend a distance of about 3/16 inch below the base 13 and each gauge is made with an opening 53 within which the end of the core fits tightly. The gauges are made of Bakelite, wood or other nonmagnetic material. When testing a sheet of stainless steel or other material having a rather high reluctance the thin gauge 50 may be used and the volume control knob 37 set to produce a desired meter reading. If the same air gap were now used to test substantially thicker members, and especially if they have much higher permeability, the meter pointer may move entirely off the scale so that it would not be possible to determine their permeability or otherwise test them. By using one or other of the thicker gauges 51, 52 this difficulty is overcome, the particular gauge used depending on the material and thickness of the workpiece.

Figure 5 shows an embodiment of the invention adapted for the easy and quick comparison of many workpieces or other members with an accepted standard part. In this case the zero reading of meter 40 is at the center of its scale 41 and the lower end 18 of core 17 is placed on the standard part S. The workpiece W to be tested is placed on top of core 17 and if it conforms to the standard, the meter will read zero. If the permeability is lower than standard the meter pointer will deviate in one direction while if its permeability is higher than standard, the pointer will deviate in the opposite direction.

Figure 6 shows a modification in which the core 17' of the energizing magnet has the shape of an inverted U so that its opposite ends 54 may be brought into engagement with the workpiece. This shortens the flux path and provides a more concentrated magnetic field and is advantageous when thick iron bars, steel railway rails and similar members require testing, a deeper penetration of the flux into the workpiece being secured.

Figure 7 shows an embodiment in which the lower end 18 of core 17 is tapered to a point, as shown, and the core is slidable within coil 21. The top of the core has a Bakelite handle 55 screwed into it and a set screw 56 passing through a threaded hole in spool head 20 is provided to hold the core in any desired position. The removal of metal to make the taper on the core causes an unsymmetrical magnetic circuit and, in the absence of the workpiece, by adjusting the core either up or down by handle 55, the magnetic circuit may be again balanced and a zero reading on the meter secured after which screw 56 is tightened. The pointed core concentrates the flux in a small area so that this form of the device is especially adapted for exploring a workpiece to detect the presence of small fissures, blow holes, particles of foreign material or other localized flaws.

Figure 8 is a schematic drawing of an embodiment of the invention arranged to operate a relay or any indicating device. In this form the adjustment of coil 24 and its core 25 is secured by mounting them on a slide 57 slidable within supporting frame members 58 provided with set screws 59 for locking the slide in its adjusted position. In addition to voltage winding 24 a second coil 60 is wound around core 25 to which current may be supplied from a battery 61 through a switch 62. Coil 24 supplies current to the winding 63 of a relay 64, the operation of which causes current from a battery 65 to operate any type of indicating device 66 as, for example, a neon tube. In this form of the invention, the unbalance of the magnetic circuit is not secured by changing the permeability of one half of the magnetic circuit but by the generation of voltage in voltage coil 24 due to its inductive coupling with coil 60.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. Means adapted to operate a relay having an operating winding comprising, in combination; a first core of paramagnetic material; an energizing coil surrounding said core and adapted to be energized by alternating current of audio frequency; a second core of paramagnetic material disposed substantially perpendicular to said first core at the center thereof and inductively coupled to said energizing coil; a voltage coil surrounding said second core; a third coil inductively coupled to said second core, the voltage across the terminals of said voltage coil being substantially zero in the absence of electrical current in said third coil; and means electrically connecting the terminals of said voltage coil to the terminals of the relay operating winding whereby the relay is operated in response to the passage of electrical current in said third coil.

2. An apparatus adapted to detect flaws in a workpiece comprising, in combination: a first core of paramagnetic material; an energizing coil surrounding said core and adapted to be energized by alternating current; a voltage coil with its axis directed toward the center of said energizing coil and inductively coupled thereto whereby the voltage across the ends of said voltage coil is substantially zero in the absence of the workpiece; a manually portable support composed of nonmagnetic material for supporting the aforesaid parts, said support having an opening therethrough and the lower end of said core being disposed in said opening; an adjustable rod composed of magnetic material mounted on said support opposite the end of said voltage coil which is remote from said core; and means for securing said rod in position to reduce the voltage across the ends of said voltage coil to zero.

3. A manually portable instrument for testing the permeability of a body comprising, in combination: a base composed of nonmagnetic material having a vertical hole therethrough; a solid core of magnetic material passing through and filling said hole, the lower end of said core being flush with the lower face of said base; a spool containing many turns of wire surrounding said core; means securing said spool to said base; a second core of magnetic material; a second spool containing many turns of wire surrounding said second core; means supporting said second spool with its axis normal to the axis of the first spool and in a horizontal plane through the center of the first spool; a long hollow cover of nonmagnetic material mounted above said base and enclosing said coils and cores; means securing said cover to said base; a pair of flexible leads passing through said cover and connected to supply the wire on said first spool with alternating current; and a pair of flexible leads passing through said cover and connected to the terminals of the wire on said second spool, said cover forming a handle adapted to be grasped by the operator's hand for moving said base along the body to be explored.

4. An instrument as claimed in claim 3; in which a pedestal of nonmagnetic material projects up from said base; a bar of magnetic material adjustably supported by said pedestal; and means for securing said bar to the pedestal in a position to cause no voltage between the terminals of the wire on the second spool in response to the passage of alternating current through the wire on the first spool.

5. An instrument for determining the magnetic permeability of different portions of a body comprising, in combination: a first core of magnetic material having an inwardly tapered end to provide a small exploring area disposed closely adjacent to said body; an energizing coil surrounding said core and adapted to be energized by alternating current; a second core of magnetic material disposed perpendicular to said first core and having one end closely adjacent to the periphery of said energizing coil at the center thereof; a voltage coil surrounding said second core, the voltage across the terminals of said voltage coil being substantially zero in the absence of the body; and a portable casing constructed to support said coils and cores so that the exploring area of said first core may be brought against the body and moved along the surface thereof.

6. An instrument as claimed in claim 5 in which said first core is adjustable vertically within the energizing coil; and means for retaining said adjustable core at any desired position within said energizing coil.

References Cited in the file of this patent

UNITED STATES PATENTS

| | | |
|---|---|---|
| 1,910,820 | Blinn | May 23, 1933 |
| 1,925,904 | Mayne | Sept. 5, 1933 |
| 2,065,118 | Davis | Dec. 22, 1936 |
| 2,228,294 | Wurzbach | Jan. 14, 1941 |
| 2,321,356 | Berman | June 8, 1943 |
| 2,447,316 | Curtis | Aug. 17, 1948 |
| 2,511,233 | Anderson | June 13, 1950 |
| 2,554,575 | Kurtz et al. | May 29, 1951 |
| 2,563,254 | Lewis | Aug. 7, 1951 |
| 2,609,530 | Tricebock et al. | Sept. 2, 1952 |